US006965386B2

(12) United States Patent
Appel et al.

(10) Patent No.: US 6,965,386 B2
(45) Date of Patent: Nov. 15, 2005

(54) METHOD FOR THREE DIMENSIONAL IMAGE RECONSTRUCTION

(75) Inventors: Mirko Appel, Tangstedt (DE); Nassir Navab, Plainsboro, NJ (US)

(73) Assignee: Siemens Corporate Research, Inc., Princeton, NJ (US)

(*) Notice: Subject to any disclaimer, the term of this patent is extended or adjusted under 35 U.S.C. 154(b) by 267 days.

(21) Appl. No.: 10/321,173

(22) Filed: Dec. 17, 2002

(65) Prior Publication Data

US 2003/0137508 A1 Jul. 24, 2003

Related U.S. Application Data (60) Provisional application No. 60/343,014, filed on Dec. 20, 2001.

(51) Int. Cl.[7] .............................................. G06T 17/00
(52) U.S. Cl. ..................................................... 345/629
(58) Field of Search ................................ 345/419, 629; 382/113, 154

(56) References Cited

U.S. PATENT DOCUMENTS 3,726,591 A * 4/1973 Helava et al. .................. 356/2

OTHER PUBLICATIONS

Registration of Technical Drawings and Calibrated Images for Industrial Augmented Reality. Appel et al. Applications of Computer Vision, 2000, Fifth IEEE Workshop on Dec. 4–6, 2000, p. 48–55.*

Scene Augmentation via The Fusion of Industrial Drawings and Uncalibrated Images With A View To Marker–less Calibration. Navab et al. Augmented Reality, 1999. Proceedings. 2nd IEEE and ACM International Workshop on Oct. 20–21, 1999. p. 125–133.*

Epipolar Line Estimation and Rectification for Stereo Image Parts. Papadimitriou et al. IEEE Transactions on Image Processing. vol. 5, No. 4, Apr. 1996.*

* cited by examiner

*Primary Examiner*—Mark Zimmerman
*Assistant Examiner*—Peter-Anthony Pappas (57) ABSTRACT

A method for three-dimensional (3D) image reconstruction includes the steps of registering an orthographic image of a scene, combining a photogrammetric image and a technical drawing of the scene to form a co-registered orthographic and perspective (COP) image, and reconstructing a 3D image from the COP image.

5 Claims, 5 Drawing Sheets

METHOD FOR THREE DIMENSIONAL IMAGE RECONSTRUCTION

CROSS-REFERENCE TO RELATED APPLICATIONS

Reference is hereby made specifically to copending U.S. Provisional Patent Application No. 60/343,014 filed Dec. 20, 2001 in the names of inventors Mirko Appel and Nassir Navab, entitled 3D RECONSTRUCTION FROM CO-REGISTERED ORTHOGRAPHIC AND PERSPECTIVE (COP) IMAGES, and whereof the disclosure is hereby incorporated by reference herein and whereof the benefit of priority is claimed.

Reference is also hereby made specifically to copending U.S. Provisional Patent Application 60/432,473, filed Dec. 11, 2002 in the names of inventors Mirko Appel and Nassir Navab, entitled 3D RECONSTRUCTION FROM CO-REGISTERED ORTHOGRAPHIC AND PERSPECTIVE IMAGES: THEORETICAL FRAMEWORK AND APPLICATIONS, and whereof the disclosure is hereby incorporated by reference herein and whereof the benefit of priority is claimed.

BACKGROUND OF THE INVENTION

The present application relates to the field of image reconstruction and, more specifically, to three dimensional (3D) image reconstruction.

FIELD OF THE INVENTION

In plants and factories, maintenance and repair are very cost intensive processes. The costs include not only expenses for the actual work being carried out, but also the ancillary costs associated with outages during repair and/or maintenance. Well planed, time efficient work is therefore essential to reduce costs. For example, re-installations or changes of large components require a careful study of the environment to check whether the new part can be transported to the place where it has to be installed or fitted in. In an ideal situation, planning can be done using 3D models of the facilities. However, and particularly in traditional industries such as power generation or chemical works, many plant managers and factory owners do not have such models available at their disposal. The most commonly available document is the technical drawing. In these cases, "as-built" reconstruction is generally the only practicable way to obtain precise and up to date 3D models.

A widely used method for such as-built reconstruction is close-range photogrammetry. The photogrammetric reconstruction process typically consists of three steps:

1. Taking pictures of the areas of interest;
2. Calibrating the images; and
3. 3D reconstruction by interactive identification of homologous features in multiple images.

Step 2 is usually automated to a high degree. Generally, coded markers are put into the scene in step 1 before taking the pictures. These markers are automatically recognized in various images in step 2 and are used as point correspondences to estimate the calibration parameters. The result of the calibration procedure is herein referred to as a calibrated image database. When larger areas of a facility are modeled, such a database can easily contain several hundreds or thousands of images. Step 3 is generally the most critical. Application of methods for automatic reconstruction is typically very difficult in industrial environments. In some particular cases, an automatic feature extraction method, such as, for example, that described by Heuel et al. may be applied for basic reconstruction or for assisting the user in the selection process. See Stephan Heuel, Wolfgang Förstner, and Felicitas Lang: Topological and geometrical reasoning in 3d grouping for reconstructing polyhedral surfaces; In Proceedings of ISPRS Congress, Amsterdam, July 2000.

BRIEF SUMMARY OF THE INVENTION

It is herein recognized by the present inventors that many of the assumptions generally made for automatic reconstruction cannot be made here. Changing lighting conditions, shadows, highlights, occlusion, and so forth present problems which need to be addressed. In addition, a large number of types of objects to be reconstructed appear very similar in the images, such as pipes or supports. As a consequence, interactive selection of corresponding features is widely used. See by way of example, H. Veldhuis and G. Vosselman: The 3d reconstruction of straight and curved pipes using digital line photogrammetry. ISPRS Journal of Photogrammetry and Remote Sensing, 53:6–16, 1998. It is herein further recognized that establishing correspondences for reconstruction is one of the bottlenecks of the entire process for various reasons, including the following.

Searching for suitable stereo images can be tedious. Even though the system might suggest images based on calibration information, it cannot predict occlusion without further knowledge of the scene. Therefore, often manual search is necessary.

The actual identification of corresponding features can be time consuming and erroneous, especially in scenes with similar looking objects: which often occur in industrial environment.

Frequently, a sufficient number of images of an object of interest may not be available, be it due to occlusion or insufficient number of images taken.

In accordance with an aspect of the invention, a method for three-dimensional (3D) image reconstruction includes the steps of registering an orthographic image of a scene, combining a photogrammetric image and a technical drawing of the scene to form a co-registered orthographic and perspective (COP) image, and reconstructing a 3D image from the COP image.

BRIEF DESCRIPTION OF THE SEVERAL VIEWS OF THE DRAWINGS

The invention will be more fully understood from the following detailed description of preferred embodiments, in conjunction with the drawings, in which.

DETAILED DESCRIPTION OF THE INVENTION

As has been stated above, establishing correspondences for reconstruction is one of the bottlenecks of the entire process for various reasons, including the frequent necessity of performing manual searches, the time required and likelihood of errors in actual identification of corresponding features in a typical industrial environment, and the frequent unavailability of a sufficient number of images of an object of interest due to reasons including occlusion or an insufficient number of images taken.

This bottleneck is overcome in accordance with the present invention by the introduction of the concept of Co-Registered Orthographic and Perspective (COP) Images. A COP image is composed of a photogrammetric image and probably the most frequently used document in plant management, a technical drawing. Co-registering and superimposing these two documents in accordance with the principles of the invention results in a new type of image, which by itself already contains 3D information.

Figure 1:
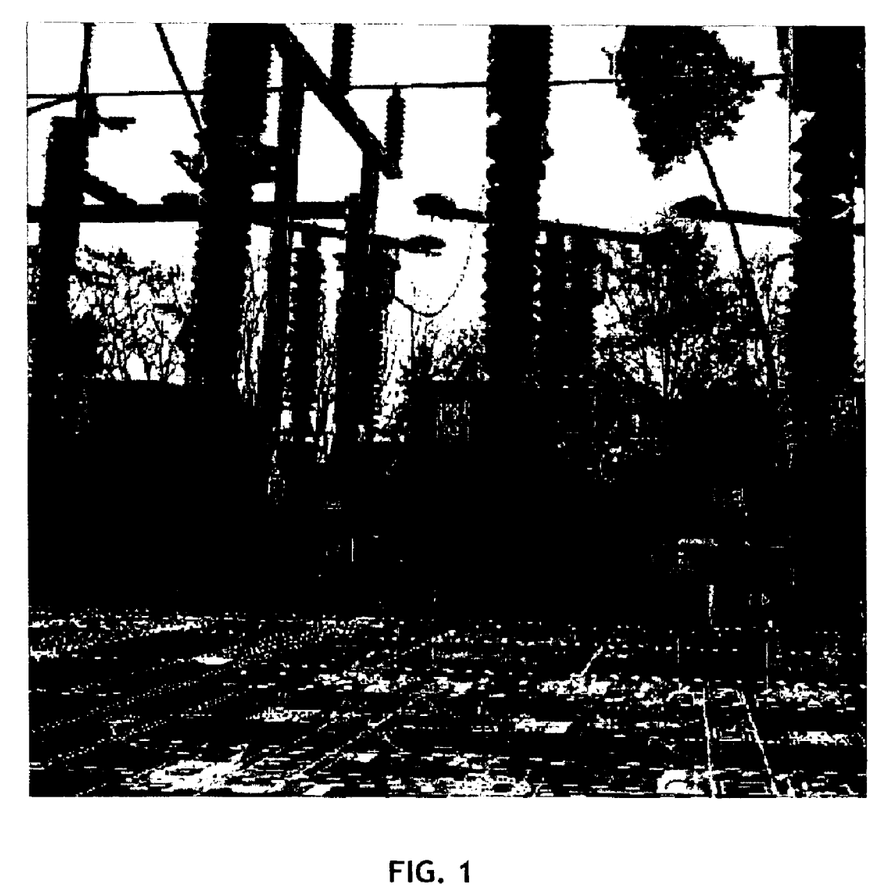
FIG. 1 shows a combined COP image in accordance with the principles of the invention.

FIG. 1 shows a combined orthographic and perspective (COP) image of a high voltage switch gear with as-built reconstruction superimposed (in red coloring) in accordance with the principles of the invention. Reconstruction can be carried out from a single COP image.

A method in accordance with the invention is described which utilizes a metric planar transformation to register drawings with a calibrated image database. Once registration is done, COP images can be automatically generated from all images in the database. For registration of uncalibrated images in accordance with the principles of the invention, the homography between drawings and images is directly estimated. By identifying corresponding features within a single COP image, i.e. between the photo and the superimposed drawing, the user provides sufficient information for 3D reconstruction.

In contrast to feature selection in multiple regular images, the selection process in a COP image is much faster and less subject to errors since corresponding features are visually close to each other. The correspondence very often becomes obvious. The subject of as-built reconstruction using images and drawings as such, has been addressed in previous publications. See, for example, Nassir Navab, Mirko Appel, Yakup Gene, Benedicte Bascle, Vijay Kumar, and Martin Neuberger: As-built reconstruction using images and industrial drawings; in Mustererkennung 2000-22nd DAGM Symposium, pages 1–8, Kiel, Germany, September 2000. However, in accordance with the principles of the present invention, a detailed methodology as well as a mathematical framework for reconstruction and its implementation are introduced for the first time. Epipolar geometry for COP images is introduced in order to further assist the user in selecting the correspondences. This reduces ambiguities between corresponding features in images and drawings to a minimum.

The method for 3D reconstruction in accordance with an aspect of the present invention is based on co-registered technical drawings and images. Instead of gaining 3D information from multiple perspective images of a scene, only a single perspective image is utilized which is augmented by a registered 2D drawing of the scene. As has been stated above, by superimposing images with drawings the new type of document is created herein referred to as a COP mage. A COP image contains two images, whose spatial relationship in regard to each other is known. By identifying corresponding features within the COP image, between the perspective image and the drawing, the same information is provided as if two separate images were used. Due to the visual combination of both documents, however, this correspondence identification becomes much simpler and less subject to errors.

In order to generate COP images, separate drawings and images have to be registered. Methods are described below in accordance with the present invention for registration of drawings with both uncalibrated and calibrated images. For calibrated images, the method uses a metric planar transformation to register a drawing to multiple calibrated images simultaneously. Furthermore, epipolar geometry relations are introduced for the special case of a perspective and an orthographic view. This is used to assist the user in selecting the corresponding features within the COP image by displaying epipolar lines.

Next, an introduction of the notation utilized is given, followed by a description of methods in accordance with the present invention for registering drawings with both uncalibrated and calibrated images. Then, a mathematical framework for point reconstruction and epipolar geometry in COP images is introduced, followed by results of application to industrial as-built reconstruction are presented.

The following symbols are defined as:

T transpose of a matrix, used as superscript (e. g. $R^T$)

$\lambda$ projective scale factor

R rotation between drawing coordinate system and world coordinate system t translation between drawing coordinate system and world coordinate system $s_x$, $s_y$ scale of drawing in x-direction and y-direction, respectively $r_1$, $r_2$ first and second column of rotation matrix R Hereinafter, a 3D point such as $X=(X, Y, Z)^T$ in the world (factory) coordinate system, is denoted as $X_i=(X_i, Y_i, Z_i)^T$ in each camera coordinate system, and as $X_d=(X_d, Y_d, Z_d)^T$ in the drawing's coordinate system. Normalized 2D points accordingly are written as $x_i=(x_i, y_i, 1)^T$ and $x_d=(x_d, y_d, 1)^T$.

It is noted that while the present illustrative figures used herein are sufficient for the purpose of explanation of the present invention, the COP images as might be used for practical industrial as-built reconstruction may be of yet higher resolution and clarity. Certainly the use of color for the overlay in order to maintain visibility in the proceedings is most helpful and in a real application, full color would preferably be used, with resulting advantages in visibility.

In image (pixel) coordinates points are denoted by $m_i=(u_i, v_i, 1)^T$ and $m_i=(u_d, v_d, 1)^T$ in an image and a drawing, respectively. Furthermore, in parts of the present description, a database of n fully calibrated photogrammetric images is assumed to be available. This means that both intrinsic parameters $A_i$ and extrinsic parameters $R_i$, $t_i$ exist for all the cameras. See, for example, Olivier Faugeras: Three-Dimensional Computer Vision—A Geometric Viewpoint. Artificial Intelligence. The MIT Press, 1993.

Using this notation, projection of a 3D point onto a camera yields $$\begin{pmatrix} \lambda u_i \\ \lambda v_i \\ \lambda \\ 1 \end{pmatrix} = \begin{bmatrix} A_i R_i & A_i t_i \\ 0 & 1 \end{bmatrix} \begin{pmatrix} X \\ Y \\ Z \\ 1 \end{pmatrix} \quad (1)$$

The drawing is modeled as an image taken by an orthographic camera. The transformation between drawing and world coordinate systems is described by R, t. The scaling of the orthographic projection reflects in a set of 'intrinsic' parameters in a 3×3 matrix $A_d$.

As to the registering of technical drawings and images for reconstruction of large plant areas from multiple images, it is preferable to use coded markers to create a calibrated image database. However, for smaller projects, often only few uncalibrated images are needed. They may be taken and sent by the customer. In this case coded markers are not needed for calibration. Accordingly, it is proposed to use two different methods for registration. For uncalibrated images direct homography is used between drawing and image, for calibrated images a metric planar transformation is estimated between the drawing and the world coordinate system. Both methods will be described in the following sections.

Registering drawings with a single or a few uncalibrated images is first considered. If no calibration information about an image is available, a homography $H_i$ between a drawing and the associated plane in an image is estimated. Four point correspondences are sufficient to estimate $H_i$. If more points are available, the system becomes overconstrained and robust estimation methods can be applied. See, for example, P. H. S. Torr and A. Zisserman: Robust computation and parametrization of multiple view relations; In International Conference on Computer Vision, pages 727–732, Bombay, India, 1998.

In addition to points, other features such as lines can also be used. See, for example, N. Navab and S. Mann: Recovery of relative affine structure using the motion flow field of a rigid planar patch. In Mustererkennung 1994, Tagungsband, pages 186–196; Informatik Xpress 5; 1994. Once $H_i$ is estimated, one can extract a set of intrinsic and extrinsic parameters, $A_i$, $R_i$ and $t_i$, as described, for example, in Peter F. Sturm and Stephen J. Maybank: On plane-based camera calibration: a general algorithm, singularities, applications; in Conference on Computer Vision and Pattern Recognition, volume I, pages 432–437, Fort Collins, Colo.; June 1999; and Zhengyou Zhang: A flexible new technique for camera calibration; IEEE Transactions on Pattern Analysis and Machine Intelligence, 22(11):1330–1334; 2000.

These parameters describe camera geometry and motion of the image relative to the drawing. As will be shown, these parameters will be used for reconstruction and epipolar geometry.

Next, the matter of registering drawings with a database of calibrated images is considered. In order to register technical drawings and calibrated images, typically with a database of calibrated images, a two step procedure is utilized. In the first step a metric planar transformation is estimated between the drawing in space relative to the set of calibrated images. Based on this transformation one can estimate a homography between each image and the drawing as second step. This allows blending the drawing into each image. The coordinate system associated with the technical drawing is defined such that a point on the drawing is represented by $(X_d, Y_d, 0)^T$. The 4×4 matrix $M_{4\times4}$ represents the transformation between the drawing and the world coordinate system. See, for example, Mirko Appel and Nassir Navab: Registration of technical drawings and calibrated images for industrial augmented reality. In Proceedings WACV, pages 48–55, Palm Springs, Calif., December 2000.

One can write:

$$\begin{bmatrix} A_i R_i & A_i t_i \\ 0 & 1 \end{bmatrix} M_{4\times4} \begin{pmatrix} X_d \\ Y_d \\ 0 \\ 1 \end{pmatrix} = \begin{pmatrix} \lambda u_i \\ \lambda v_i \\ \lambda \\ 1 \end{pmatrix} \quad (2)$$

Note that $M_{4\times4}$ contains both intrinsic parameters, i.e. scale and aspect ratio, and extrinsic parameters, i.e. position and orientation, of the technical drawing. We assume that the drawing is parallel to a plane defined by two axes of the world coordinate system. This is a reasonable assumption, since drawings are usually top or side views. Here, we assume that the drawing is parallel to the plane z=0, which means we are considering a top view. Since $Z_d$=0, the third column of $M_{4\times4}$ does not affect this transformation. Without loss of generality we therefore take a 3×3 matrix M instead which consists of the upper three elements of the first, second, and fourth column of $M_{4\times4}$. After some algebraic manipulation, equation (2) can then be written as $$M \begin{pmatrix} X_d \\ Y_d \\ 1 \end{pmatrix} = [R_i^T A_i^{-1} - R_i^T t_i] \begin{pmatrix} \lambda u_i \\ \lambda v_i \\ \lambda \\ 1 \end{pmatrix} \quad (3)$$

We can solve the linear equation (3) for the components of M. This matrix depends on position, orientation and scale of the technical drawing. The matrix M describes a metric planar transformation, mapping an orthographic view onto a plane in the world coordinate system. Unlike the usual homography transformations between perspective images, this transformation is not homogeneous. Hence all nine parameters of M need to be estimated. Each point correspondence provides two constraints. Therefore, we need a minimum of five point correspondences in order to estimate M. The left hand side of (3) describes the mapping of points in the drawing to the world coordinate system. The right hand side describes an optical ray in the world coordinate system. M can be decomposed into a set of intrinsic and extrinsic camera parameters, such that $M=[s_x r_1, s_y r_2, t_d]$, where $$A_d = \begin{pmatrix} s_x & 0 & 0 \\ 0 & s_y & 0 \\ 0 & 0 & 1 \end{pmatrix}, \text{ and } R_d = [r_1, r_2, r_1 \times r_2] \quad (4)$$

Furthermore, it is apparent from (3) that the original 3D point $X_d=(X_d, Y_d, 0)^T$ became de facto a 2D point which is scaled to the pixel image coordinate system of the drawing. Consequently, we will denote such points on drawings in the following by $m_d=(u_d, v_d, 1)^T=X_d$.

It is also necessary to recover the direct mapping between the drawing and perspective images in order to blend these. Simple algebraic manipulation on (3) yields:

$$A_i R_i [m_1 \ m_2 \ m_3 + R_i^T t_i] \begin{pmatrix} u_d \\ v_d \\ 1 \end{pmatrix} = \lambda \begin{pmatrix} u_i \\ v_i \\ 1 \end{pmatrix} \quad (5)$$

where $m_k$, k=1, . . . ,3 are the column vectors of M. This defines the direct mapping or homography between the technical drawing and each of the images as:

$$H_i = A_i R_i [m_1 m_2 m_3 + R_i^T] \quad (6)$$

and we have $H_i=(u_d, v_d,1)^T=\lambda(u_i, v_i,1)^T$. Therefore, once M is estimated, homographies between the drawing and all calibrated images, often several hundreds, can be easily determined and used for generating COP images.

Figure 2A:
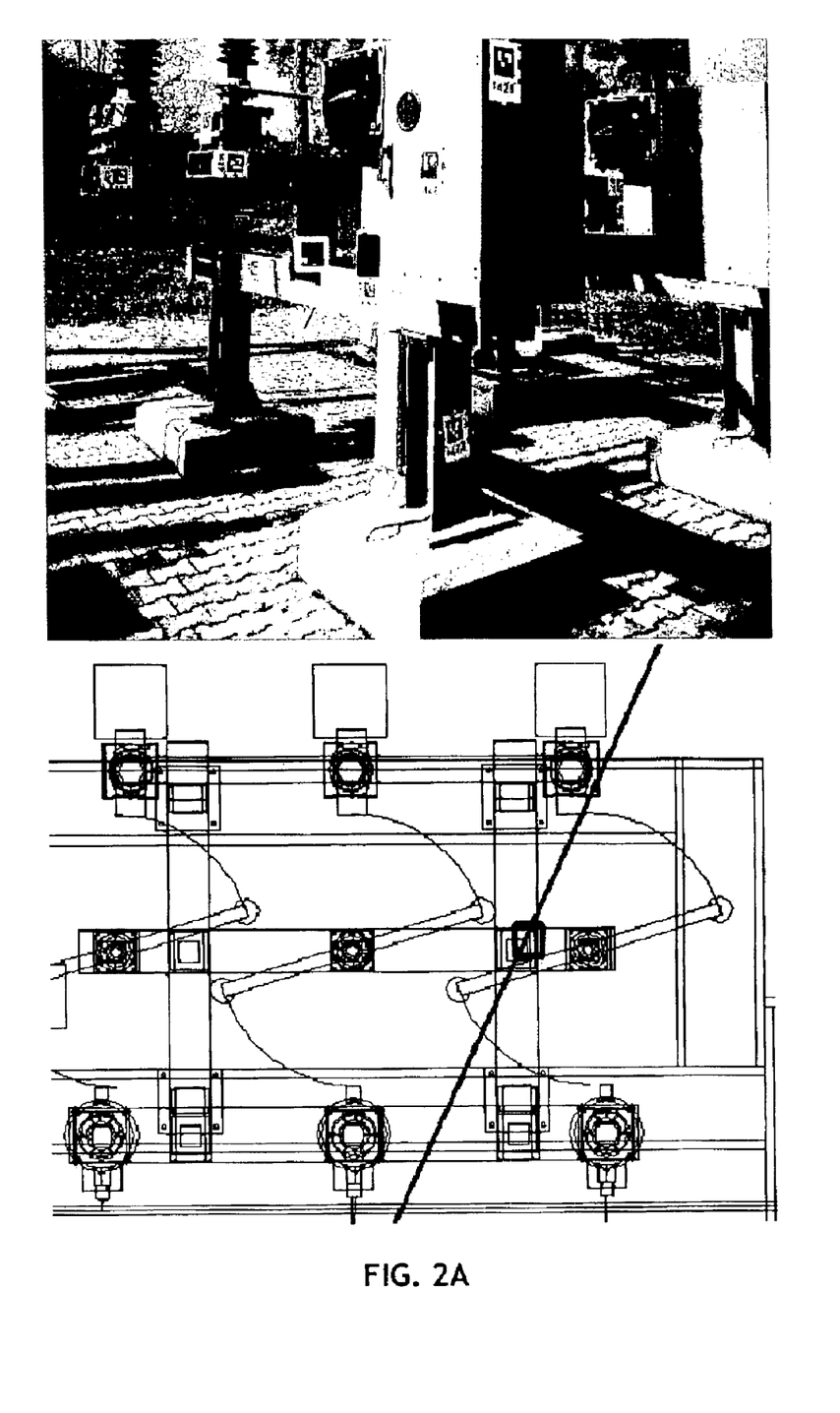
FIG. 2 shows reconstruction of a point in a co-registered orthographic and perspective (COP) image in accordance with the principles of the invention.
Figure 2B:
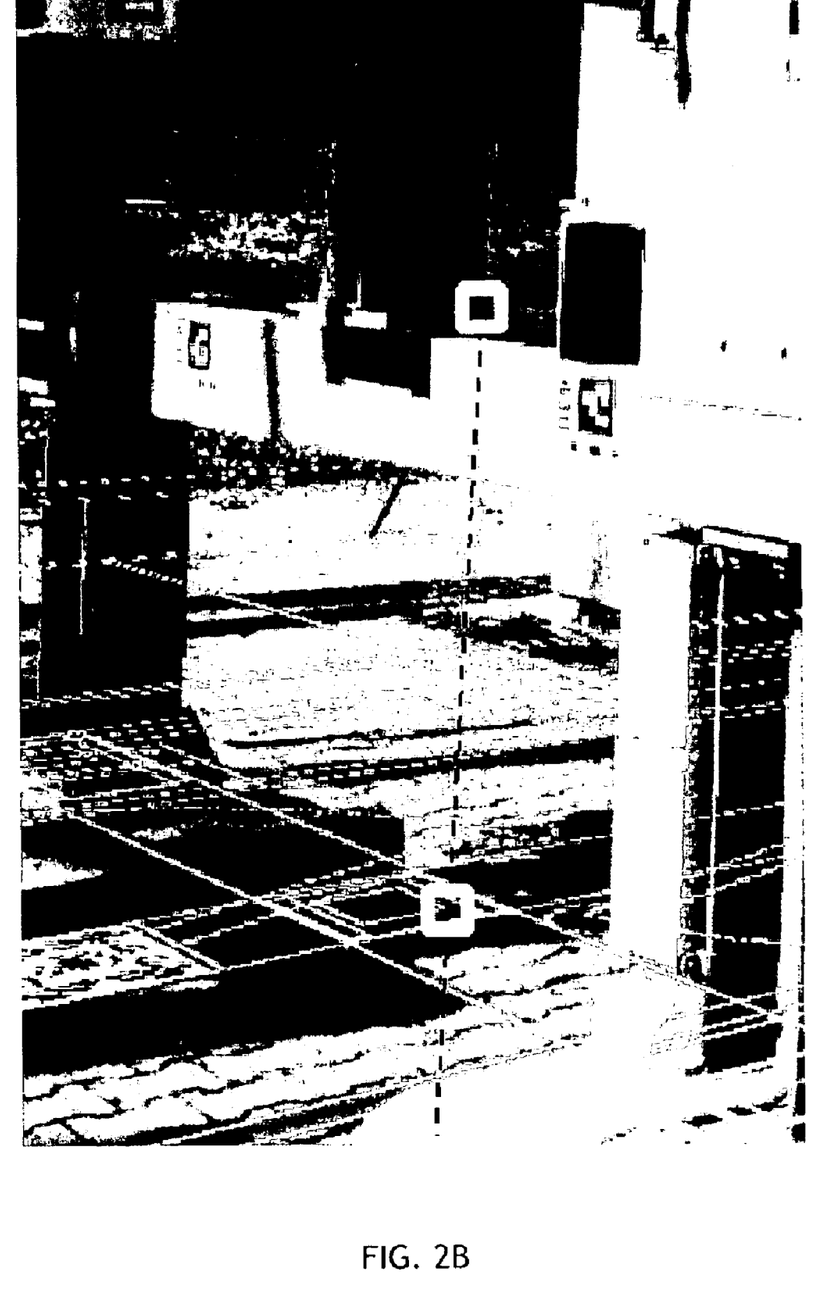

Considerations of the reconstruction from COP images follows next. In the previous section we described the registration of technical drawings and images in order to generate COP images. Now, a method for 3D reconstruction from single COP images is introduced. Reconstruction from a COP image is equivalent to reconstruction from one perspective view—the image—and one orthographic view—the drawing. However, the manual selection of corresponding features becomes much simpler, faster and less erroneous if the corresponding features are contained in a single image. There is much less space for misinterpretation of correspondences. FIG. 2 shows the selection of corresponding points for 3D reconstruction with an example of how reconstruction of a point is being carried out in a COP image. FIG. 2A shows corresponding points in separate image and drawing (indicated by frames). Selection of a point in the drawing is supported by an epipolar line on the drawing. FIG. 2B shows corresponding points in a COP image. The epipolar line on the superimposed drawing makes selection much more intuitive.

We now present the mathematical framework for reconstruction from COP images, which includes point reconstruction and associated epipolar geometry. In order to better understand the underlying geometry, we first describe the reconstruction process from one perspective and one orthographic image, and introduce epipolar geometry for this special case. Later, we will show how reconstruction is simplified by merging these two views.

Figure 3:
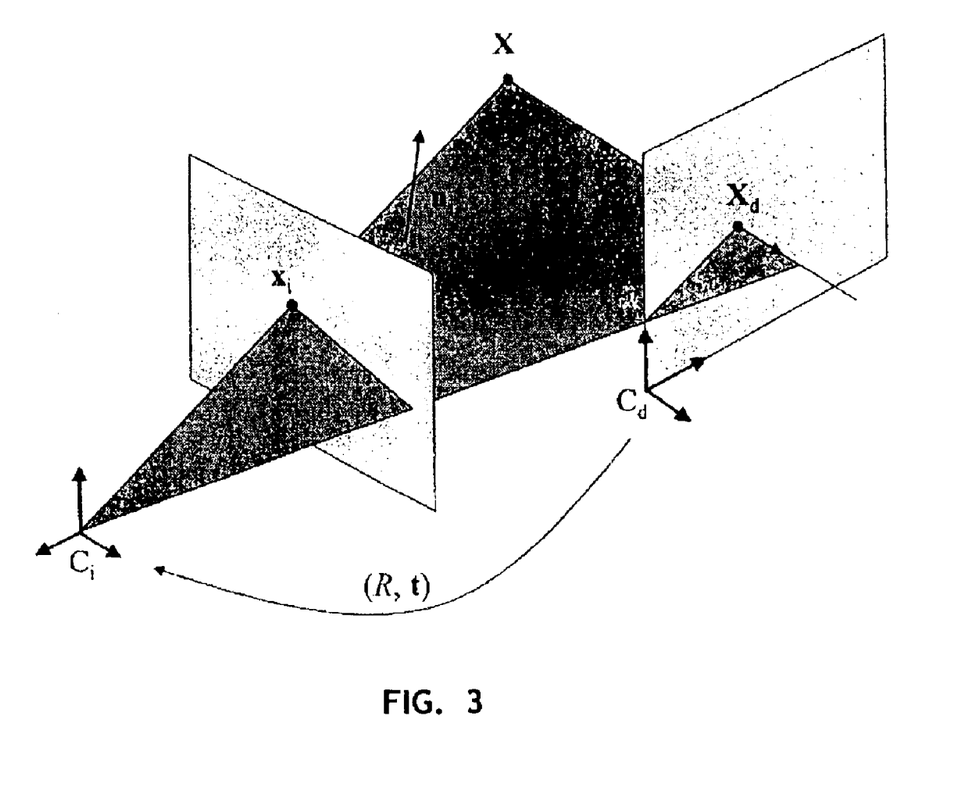
FIG. 3 shows epipolar geometry between a perspective view and an orthographic view in accordance with the principles of the invention.

The matter of the reconstruction of points follows next. We assume that the motion between the two views is known and denoted as R and t, as indicated in FIG. 3 which shows the epipolar geometry between a perspective view and an orthographic view. FIG. 3 shows the geometry between a perspective view (left) and an orthographic view (right). The transformation between both views is described by a rotation R and a translation t. A point in space X is projected in the orthographic view and the perspective view. The 2D images are denoted by $X_d$ in the orthographic view and by $x_i$ in the perspective view. The normal vector of the epipolar plane is denoted by $n_i$.

The intrinsic parameters of the perspective camera are represented by a 3×3 matrix $A_i$, the scaling parameters of the orthographic camera are represented by a 3×3 matrix $A_d$. Without loss of generality we fix the world coordinate system to the perspective view. The projection $m_i$ of a point X onto the perspective camera can be written as $$X=\lambda_i A_i^{-1} m_i, \quad (7)$$

where $\lambda_i$ is the projective scale factor. The relation between the same 3D point and its image on the drawing is given by $$X=RA_d^{-1}m_d+t+\lambda_d R(0,0,1)^T \quad (8)$$

where $\lambda_d$ stands for the unknown depth of X. The coordinates of X can be recovered by satisfying these constraints in a least squares sense. For reconstruction from a COP image, modifications on (8) are necessary. Here, the user selects instead of a point $m_d$ on the separate drawing, a point $\hat{m}_d=H_i m_d$ on the superimposed drawing. Rewriting (8) accordingly, we obtain $$X=RA_d^{-1}H_i^{-1}\hat{m}_d+t+\lambda_d r_3, \quad (9)$$

where $r_3$ denotes the third column of R.

Next, epipolar geometry in COP images is considered. In order to support the user while establishing point correspondences, we make use of epipolar geometry (see e. g. [2] for an introduction). We introduce the epipolar constraint for the case of a perspective view and an orthographic view. The constraint will then be modified for application to COP images.

Let us assume that a point is picked on the orthographic view and we want to obtain an equation for the epipolar line on the perspective view. The selected point lies on a line which can be written as $RX_d+t+\lambda R(0,0,1)^T$ in a coordinate system $C_i$. The origin of $C_i$ is included by the epipolar plane. Hence, the plane's normal vector can be obtained by $$n_i=(RX_d+t)_\times R(0,0,1)^T \quad (10)$$

Some algebraic manipulations on (10) yield $$n_i=-(r_3)_\times (r_1, r_2, t) x_d. \quad (11)$$

where $r_1, r_2$, and $r_3$ denote the columns of R, and $X_d=(X_d, Y_d, 1)^T$. We can identify the matrix E in (11) as $$E=-(r_3)\times(r_1,r_2,t). \quad (12)$$

This allows us to write the epipolar constraint for the mixed perspective orthographic case:

$$x_i^T E x_d=0 \quad (13)$$

The center of projection of the orthographic view can be considered to be at infinity. Therefore, the corresponding epipole in the perspective view is the vanishing point. Vice versa, the epipolar line in the drawing corresponding to a point in the perspective view, can be obtained by transposing (13):

$$x_d^T E^T x_i=0 \quad (14)$$

All points $x_d$ which satisfy (13) define the epipolar line of $x_i$ on the drawing. Similar to the full perspective case, we can easily obtain the Fundamental matrix (see e. g. Q. T. Luong and O. D.

Faugeras: The fundamental matrix: Theory, algorithms, and stability analysis. JJCV, 17:43–75; 1996) from the E. Rewriting (13) for pixel coordinates $m_i=A_i x_i$, and $m_d=A_d x_d$ respectively, we have $$m_i^T F m_d=0 \quad (15)$$

where $F=(A_i^{-1})^T E A_d^{-1}$. We now have the mathematical tool to assist the user in selecting corresponding points between a separate drawing and perspective image by providing epipolar lines. However, what we are aiming at here, is to carry out reconstruction within a single COP image. In order to provide epipolar lines also in this kind of image, we have to modify the Fundamental matrix defined in (15). Let the relation between a point on the drawing $m_d$ and the corresponding point in the COP image $\hat{m}_d$ be given by homography such that $\hat{m}_d=H_i m_d$ . . . Modifying (15) accordingly, we obtain $$m_i^T(A_i^{-1})^T E A_d^{-1} H^{-1} \hat{m}_d=0, \quad (16)$$

such that the Fundamental matrix for COP images is given by $$\hat{F}=(A_i^{-1})^T E A_d^{-1} H^{-1} \quad (17)$$

For practical 3D reconstruction usually a point in the perspective image is selected and the epipolar line on the superimposed drawing is required. The constraint for all points md on this line is given by transposing (16):

$$m_d^T(H^{-1})^T(A_d^{-1})^T E^T A_i^{-1} m_i=\hat{m}_d^T \hat{F}^t m_i=0 \quad (18)$$

How do epipolar lines defined by (18) and (16) appear on a COP image? Let us assume a point $m_i$ is selected in the perspective part of the COP image. It is apparent that the epipolar line on the drawing appears in the perspective image as a line which is perpendicular to the drawing (see FIG. 3). This orthogonality is not affected by blending the drawing into the image. Therefore, also on a COP image the epipolar line appears as a line perpendicular to the superimposed drawing as can be seen from FIG. 2. Hence, instead of defining the epipolar line by the epipolar constraint, we can also take a line which passes through $m_i$ and through the vertical vanishing point corresponding to the projection of $R(0, 0, 1)^T$.

Next, application to industrial as-built reconstruction is considered. The method of the present invention has been successfully applied to a high voltage switch gear. A total of 23 point correspondences between the drawing and 9 different images of a calibrated image database were used to estimate the metric planar transformation between drawing and image.

Figure 4A:
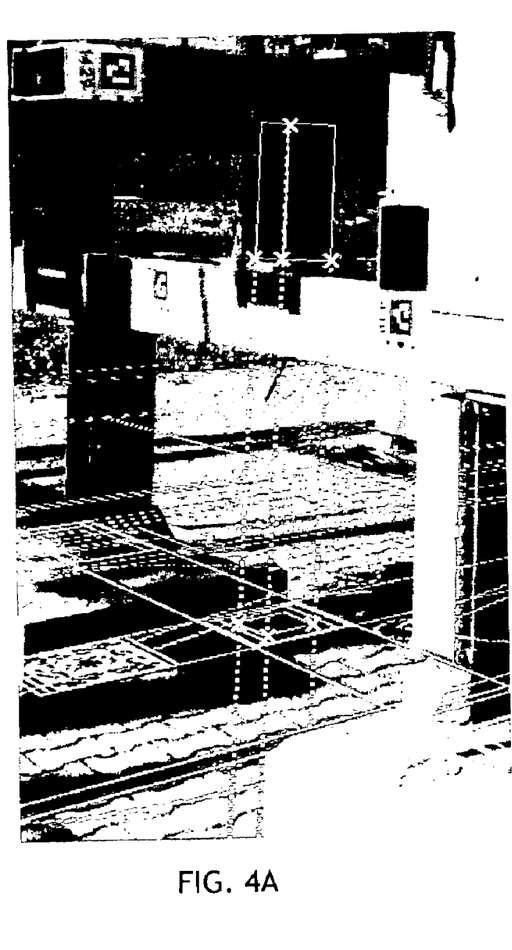
FIG. 4 shows a reconstruction of an object, in accordance with the principles of the invention.
Figure 4B:
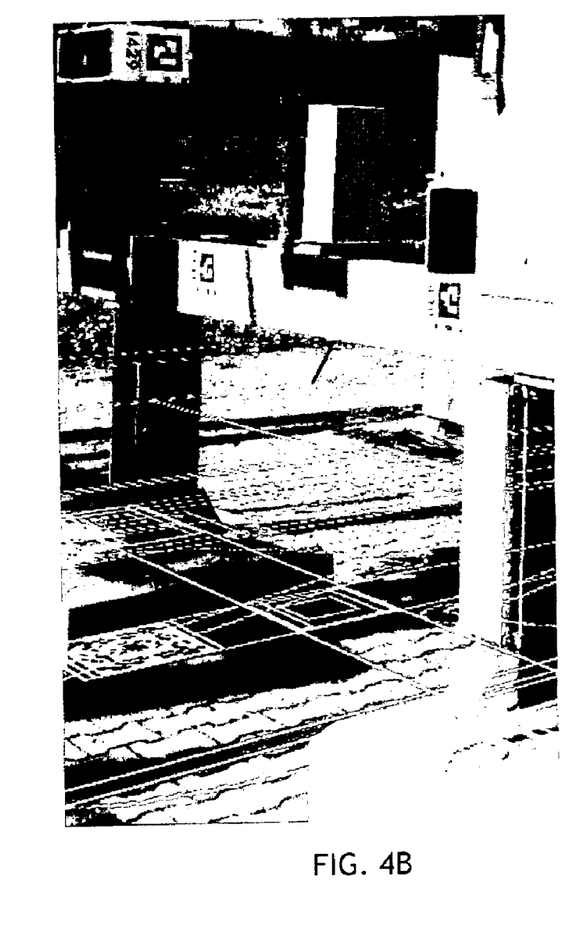

In FIG. 4 reconstruction of part of a steel support in switchgear equipment is shown. For this reconstruction the user selected points on the perspective image and was guided to the corresponding points in the drawing by the epipolar lines depicted. FIG. 4A corresponding points in separate image and drawing, indicated by frames; selection of a point in the drawing is supported by the epipolar line on the drawing. FIG. 4B shows corresponding points in the COP image; the epipolar line on the superimposed drawing makes selection much more intuitive.

It is apparent that for an accurate reconstruction, a precise superimposition is crucial. When using a database of calibrated images, we have access to multiple COP images. In this case, reconstruction from one COP image can be projected onto other COP images. This can be used to refine the result in order to obtain highly accurate reconstruction.

The invention has been described by way of exemplary embodiments. Methods have been disclosed for creation of and reconstruction from co-registered orthographic and perspective images. In order to register drawings and images, direct homography is used for uncalibrated images, and a planar metric transformation for calibrated images. A framework is introduced for reconstruction from COP images. This includes recovery of epipolar geometry for this particular case. 3D reconstruction from a COP image is much more efficient and intuitive to the user than from multiple perspective and orthographic images. Especially if supported by epipolar lines within the COP image, ambiguities in feature correspondences can be reduced to a minimum. Furthermore, this method of reconstruction has a considerable potential for automation. One can take advantage both from progress in feature detection in perspective images and vectorization of technical drawings. This allows further minimizing user interaction during the reconstruction process.

As will be understood by one of skill in the art to which the present invention pertains, various changes and modifications will be apparent. Such changes and substitutions which do not depart from the spirit of the invention are contemplated to be within the scope of the invention which is defined by the claims following.

What is claimed is:

1. A method for three-dimensional (3D) image reconstruction comprising the steps of:

registering drawings with a calibrated image database for creating a set of calibrated images;

generating a co-registered orthographic and perspective (COP) image from said set of calibrated images;

repeating said step of generating a COP image utilizing different ones from said set of calibrated images, thereby generating at least one further COP image; and combining said first and at least one further COP image and thereby refining a resulting reconstructed image.

2. A method for three-dimensional (3D) image reconstruction as recited in claim 1, wherein said step of registering drawings comprises the steps of:

estimating a metric planar transformation between a drawing in space relative to said set of calibrated images; and utilizing said metric planar transformation to register drawings.

3. A method for three-dimensional (3D) image reconstruction as recited in claim 1, wherein said step of registering drawings comprises the steps of:

estimating a homography between each image of said set and said drawing; and blending said drawing into each image of said set.

4. A method for three-dimensional (3D) image reconstruction as recited in claim 1, wherein said step of reconstructing a 3D image from said COP image comprises:

a step of utilizing user identification of corresponding features within said COP image for said reconstructing.

5. A method for three-dimensional (3D) image reconstruction as recited in claim 1, including a step of including user input data in said step of blending.

* * * * *